(12) United States Patent
Alvarez

(10) Patent No.: US 6,691,879 B1
(45) Date of Patent: Feb. 17, 2004

(54) LAUNDRY CART SYSTEM

(76) Inventor: Adriana Alvarez, 401 W. 40th St. #4-S, New York City, NY (US) 10018

( * ) Notice: Subject to any disclaimer, the term of this patent is extended or adjusted under 35 U.S.C. 154(b) by 0 days.

(21) Appl. No.: 10/412,088

(22) Filed: Apr. 11, 2003

(65) Prior Publication Data

(65)

(51) Int. Cl.$^7$ .................................................. A47F 5/00
(52) U.S. Cl. ..................................... 211/175; 211/85.24
(58) Field of Search .............................. 211/175, 85.3, 211/85.24, 193, 195, 208, 204; 280/79.2

(56) References Cited

U.S. PATENT DOCUMENTS

| | | | |
|---|---|---|---|
| 1,393,054 A | * 10/1921 | Turner | 211/60.1 |
| 2,020,766 A | * 11/1935 | Brown | 280/639 |
| 2,095,384 A | 10/1937 | Gleitsman | |
| D142,639 S | 10/1945 | Kohen | |
| 4,585,283 A | 4/1986 | Redmon et al. | |
| 4,821,903 A | * 4/1989 | Hayes | 280/47.26 |
| 4,915,329 A | * 4/1990 | Doninger | 248/98 |
| 5,118,173 A | 6/1992 | Proctor et al. | |
| 5,154,359 A | * 10/1992 | Junta et al. | 280/79.2 |
| D336,696 S | 6/1993 | Bateman et al. | |
| 5,611,554 A | * 3/1997 | Eckloff | 280/79.2 |
| 5,967,342 A | 10/1999 | Steffine | |
| 6,422,405 B1 | * 7/2002 | Haenszel | 211/175 |
| 6,478,166 B2 | * 11/2002 | Hung | 211/26 |

* cited by examiner

Primary Examiner—Alvin Chin-Shue
Assistant Examiner—Sarah Purol

(57) ABSTRACT

A laundry cart system includes a frame assembly that has a first portion and a second portion. The first portion and second portions have a pair of vertical support members, a pair of lateral support members extend between the pair of vertical support members, an upper pair of longitudinal support members and a lower pair of longitudinal support members. The second upper pair of longitudinal support members has a spaced substantially parallel relationship with the second lower pair of longitudinal support members. The first portion is couplable to the second portion for forming a support frame has a rectangular cross-section.

13 Claims, 3 Drawing Sheets

LAUNDRY CART SYSTEM

BACKGROUND OF THE INVENTION

1. Field of the Invention

The present invention relates to clothes hampers and more particularly pertains to a new laundry cart system for fulfilling the need for an easier and more effective means of transporting laundry to the laundry room.

2. Description of the Prior Art

The use of clothes hampers is known in the prior art. U.S. Pat. No. 5,118,173 describes a laundry hamper assembly for the segregated collection and storage of soiled laundry. Another type of clothes hampers is U.S. Pat. No. 5,967,342 describing a multipurpose laundry cart for supporting laundry bags and providing the user with a drop leaf folding table and ironing board. U.S. Pat. No. 2,095,384 describes a clothes hamper for storing soiled clothes.

While these devices fulfill their respective, particular objectives and requirements, the need remains for a laundry cart system that offers the user more flexibility than that of other conventional devices.

SUMMARY OF THE INVENTION

The present invention meets the needs presented above by including separate laundry bags, and adjustable frame, and a hangar system for hanging clothes.

Another object of the present invention is to provide a new laundry cart system that would be of lightweight and compact design appealing for use by people who live in an apartment building.

Still another object of the present invention is to provide a new laundry cart system that would help to reduce excessive strain on the back, when carrying heavy loads of laundry using traditional methods.

To this end, the present invention generally comprises a frame assembly that has a first portion and a second portion. The first portion has a pair of vertical support members. The first portion has a pair of lateral support members. The lateral support members extend between the pair of vertical support members. The first portion has an upper pair of longitudinal support members that extend outwardly from the pair of vertical support members. The first portion has a lower pair of longitudinal support members that extend outwardly from the pair of vertical support members. The upper pair of longitudinal support members has a spaced substantially parallel relationship with the lower pair of longitudinal support members. The second portion has a pair of second vertical support members. The second portion has a pair of second lateral support members. The second lateral support members extend between the pair of second vertical support members. The second portion has a second upper pair of longitudinal support members that extend outwardly from the pair of second vertical support members. The second portion has a second lower pair of longitudinal support members that extend outwardly from the pair of second vertical support members. The second upper pair of longitudinal support members has a spaced substantially parallel relationship with the second lower pair of longitudinal support members. The first portion is couplable to the second portion for forming a support frame has a rectangular cross-section.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
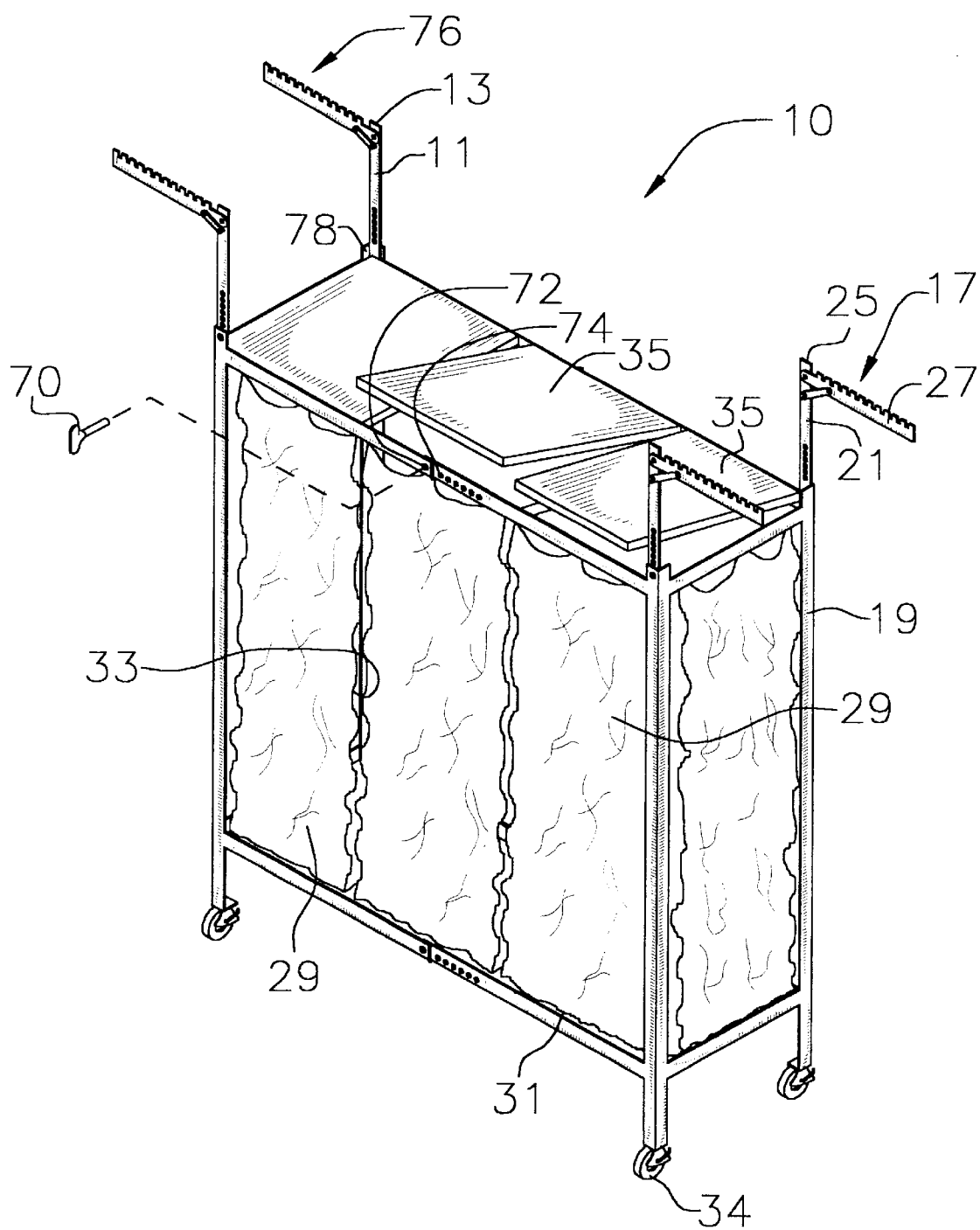
FIG. 1 is a perspective view of a new laundry cart system according to the present invention.
Figure 2:
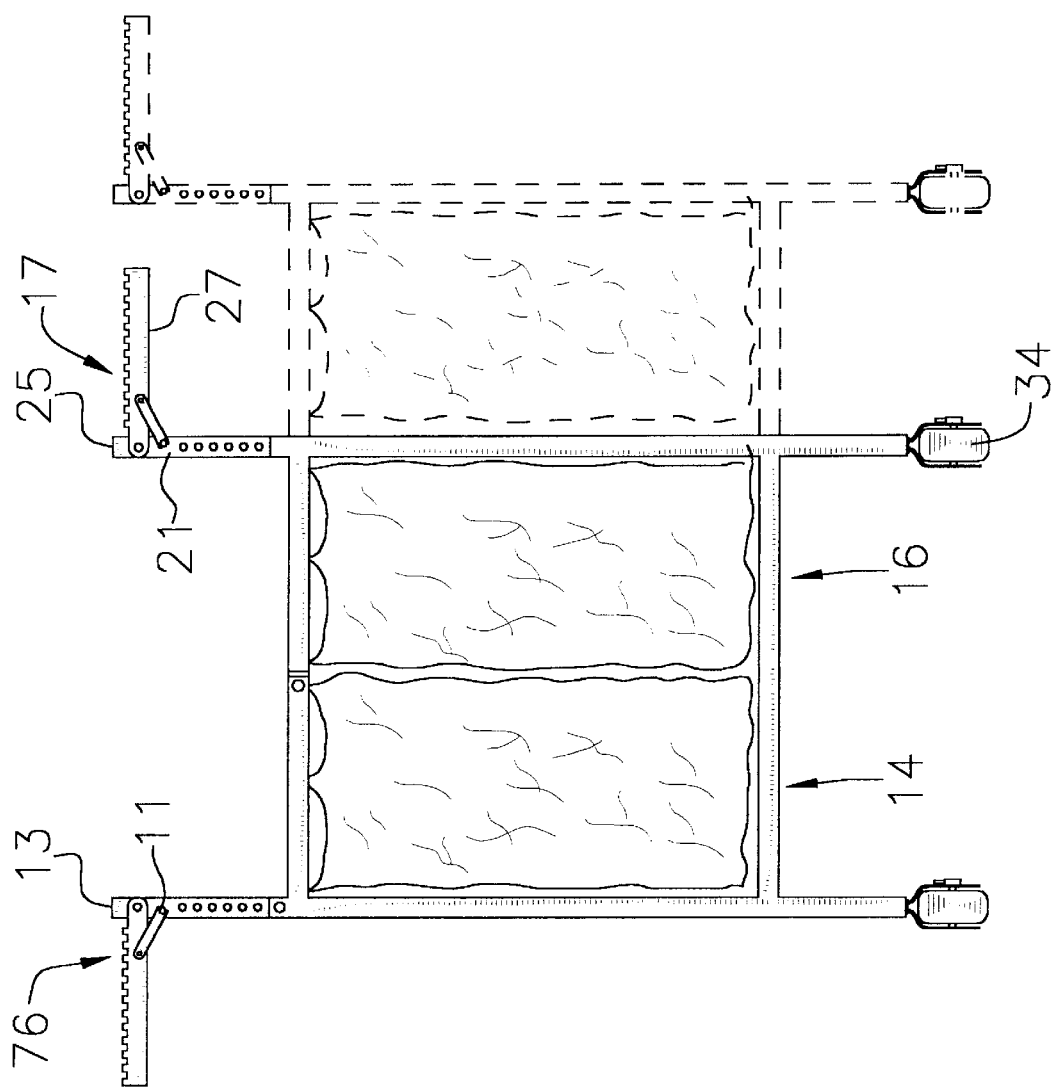
FIG. 2 is a side view of the present invention.
Figure 3:
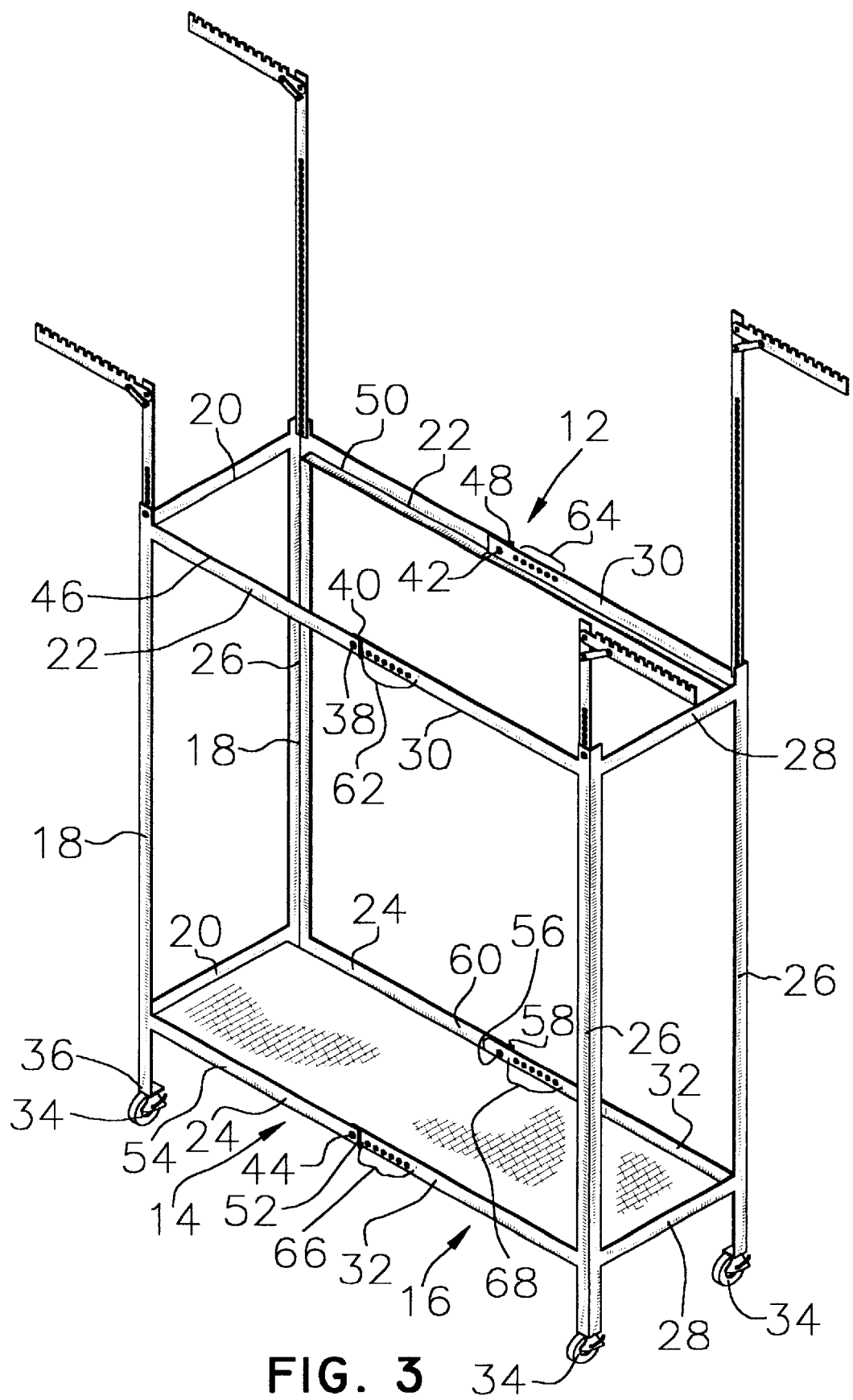
FIG. 3 is a perspective view of the present invention.

With reference now to the drawings, and in particular to FIGS. 1 through 3 thereof, a new laundry cart system embodying the principles and concepts of the present invention and generally designated by the reference numeral 10 will be described.

As best illustrated in FIGS. 1 through 3, the laundry cart system 10 generally comprises a frame assembly 12 that has a first portion 14 and a second portion 16. The first portion 14 has a pair of vertical support members 18. The first portion 14 has a pair of lateral support members 20. The lateral support members 20 extend between the pair of vertical support members 18. The first portion 14 has an upper pair of longitudinal support members 22 that extend outwardly from the pair of vertical support members 18. The first portion 14 has a lower pair of longitudinal support members 24 that extend outwardly from the pair of vertical support members 18. The upper pair of longitudinal support members 22 has a spaced substantially parallel relationship with the lower pair of longitudinal support members 24. The second portion 16 has a pair of second vertical support members 26. The second portion 16 has a pair of second lateral support members 28. The second lateral support members 28 extend between the pair of second vertical support members 26. The second portion 16 has a second upper pair of longitudinal support members 30 that extend outwardly from the pair of second vertical support members 26. The second portion 16 has a second lower pair of longitudinal support members 32 that extend outwardly from the pair of second vertical support members 26. The second upper pair of longitudinal support members 30 has a spaced substantially parallel relationship with the second lower pair of longitudinal support members 32. The first portion 14 is couplable to the second portion 16 for forming a support frame has a rectangular cross-section.

Each one of the plurality of wheels 34 is coupled to a distal end 36 of an associated one of the first 18 and second 26 vertical support members. The plurality of wheels 34 facilitates rolling the system along a horizontal support surface such as a floor.

A first aperture 38 extends through a distal end 40 of a first one of the upper longitudinal support members 46. The first aperture 38 is for facilitating coupling of the first portion 14 to the second portion 16. A second aperture 42 extends through a distal end 48 of a second one of the upper longitudinal support members 50. The second aperture 42 is for facilitating coupling of the first portion 14 to the second portion 16. A third aperture 44 extends through a distal end 52 of a first one of the lower longitudinal support members 54. The third aperture 44 is for facilitating coupling of the first portion 14 to the second portion 16. A fourth aperture 56 extends through a distal end 58 of a second one of the lower longitudinal support members 60. The fourth aperture 56 is for facilitating coupling of the first portion 14 to the second portion 16.

Each one of the first plurality of bores 62 extends through a distal end 48 of a first one of the second upper longitudinal support members. The first plurality of bores 62 is for facilitating coupling of the first portion 14 to the second portion 16. Each one of the first plurality of bores 62 is alignable with the first aperture 38 for adjusting a length of the frame assembly 12.

Each one of the second plurality of bores 64 extends through a distal end 48 of a second one of the second upper longitudinal support members. The second plurality of bores is for facilitating coupling of the first portion to the second portion. Each one of the second plurality of bores 64 is alignable with the second aperture 42 for adjusting a length of the frame assembly 12.

Each one of the third plurality of bores 66 extends through a distal end of a first one of the second lower longitudinal support members. The third plurality of bores 66 is for facilitating coupling of the first portion 16 to the second portion 16. Each one of the third plurality of bores 66 is alignable with the third aperture 44 for adjusting a length of the frame assembly 12.

Each one of the fourth plurality of bores 68 extends through a distal end of a second one of the second lower longitudinal support members. The fourth plurality of bores 68 is for facilitating coupling of the first portion 14 to the second portion 16. Each one of the fourth plurality of bores 68 is alignable with the fourth aperture 56 for adjusting a length of the frame assembly 12.

Each one of the plurality of pin members 70 is insertable through an associated pairing of a first portion aperture 72 with a second portion bore 74 for securing the first portion 14 to the second portion 74.

A first hanger assembly 76 is coupled to a first one of the pair of vertical supports 18. The hanger assembly 76 is designed for receiving conventional clothes hangers for facilitating hanging clothes after laundering. The first hanger assembly 76 further includes a vertical hanger member 11 slidably coupled to the first vertical support 78. The vertical hanger member 11 is positionable such that a height of a distal end 13 of the vertical hanger member 11 relative to the frame assembly 12 is adjustable. A horizontal hanger member 15 is pivotally coupled to the distal end 13 of the vertical hanger member 11. The horizontal hanger member 15 is designed for receiving conventional clothes hangers.

A second hanger assembly 17 is coupled to a first one of the pair of second vertical supports 19. The second hanger assembly 17 is designed for receiving conventional clothes hangers for facilitating hanging clothes after laundering. A second vertical hanger member 21 is slidably coupled to the first vertical support 23. The second vertical hanger member 21 is positionable such that a height of a distal end 25 of the second vertical hanger member 21 relative to the frame assembly 12 is adjustable. A second horizontal hanger member 27 is pivotally coupled to the distal end 25 of the second vertical hanger member 21. The second horizontal hanger member 21 is designed for receiving conventional clothes hangers.

Each one of the laundry bags 29 has a bottom wall 31 and a perimeter wall 33 extending upwardly. The perimeter wall 33 is couplable to the frame assembly 12 such that the laundry bag 29 is held in an open portion while coupled to the frame assembly 12.

A plurality of lid members 35 is hingably couplable to the frame assembly 12. Each one of the plurality of lid members 35 is for selectively closing an opening of an associated one of the plurality of laundry bags 29 for inhibiting access to an interior of the laundry bag 29.

In use, a user would sort the clothes and place into the appropriate compartments. The user would then transport the present invention to the laundry room. After washing and drying the clothes, they could be folded and placed back inside the unit for transportation from the laundry room to the bedroom. It would also feature two extension rods located on each side of the cart for use in hanging clothing.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A laundry cart system comprising:

a frame assembly having a first portion and a second portion;

said first portion having a pair of vertical support members, said first portion having a pair of lateral support members, said lateral support members extending between said pair of vertical support members, said first portion having an upper pair of longitudinal support members extending outwardly from said pair of vertical support members, said first portion having a lower pair of longitudinal support members extending outwardly from said pair of vertical support members, said upper pair of longitudinal support members having a spaced substantially parallel relationship with said lower pair of longitudinal support members;

said second portion having a pair of second vertical support members, said second portion having a pair of second lateral support members, said second lateral support members extending between said pair of second vertical support members, said second portion having an second upper pair of longitudinal support members extending outwardly from said pair of second vertical support members, said second portion having a second lower pair of longitudinal support members extending outwardly from said pair of second vertical support members, said second upper pair of longitudinal support members having a spaced substantially parallel relationship with said second lower pair of longitudinal support members;

said first portion being couplable to said second portion for forming a support frame having a rectangular cross-section.

2. The system of claim 1, further comprising a plurality of wheels, each one of said plurality of wheels being coupled to a distal end of an associated one of said first and second vertical support members, said plurality of wheels facilitating rolling said system along a horizontal support surface such as a floor.

3. The system of claim 1, further comprising:
   a first aperture extending through a distal end of a first one of said upper longitudinal support members, said first aperture being for facilitating coupling of said first portion to said second portion;
   a second aperture extending through a distal end of a second one of said upper longitudinal support members, said second aperture being for facilitating coupling of said first portion to said second portion;
   a third aperture extending through a distal end of a first one of said lower longitudinal support members, said third aperture being for facilitating coupling of said first portion to said second portion;
   a fourth aperture extending through a distal end of a second one of said lower longitudinal support members, said fourth aperture being for facilitating coupling of said first portion to said second portion;
   a first plurality of bores, each one of said first plurality of bores extending through a distal end of a first one of said second upper longitudinal support members, said first plurality of bores being for facilitating coupling of said first portion to said second portion, each one of said first plurality of bores being alignable with said first aperture for adjusting a length of said frame assembly;
   a second plurality of bores, each one of said second plurality of bores extending through a distal end of a second one of said second upper longitudinal support members, said second plurality of bores being for facilitating coupling of said first portion to said second portion, each one of said second plurality of bores being alignable with said second aperture for adjusting a length of said frame assembly;
   a third plurality of bores, each one of said third plurality of bores extending through a distal end of a first one of said second lower longitudinal support members, said third plurality of bores being for facilitating coupling of said first portion to said second portion, each one of said third plurality of bores being alignable with said third aperture for adjusting a length of said frame assembly; and
   a fourth plurality of bores, each one of said fourth plurality of bores extending through a distal end of a second one of said second lower longitudinal support members, said fourth plurality of bores being for facilitating coupling of said first portion to said second portion, each one of said fourth plurality of bores being alignable with said fourth aperture for adjusting a length of said frame assembly.

4. The system of claim 3, further comprising a plurality of pin members, each one of said plurality of pin members being insertable through an associated pairing of a first portion aperture with a second portion bore for securing said first portion to said second portion.

5. The system of claim 1, further comprising a first hanger assembly coupled to a first one of said pair of vertical supports, said hanger assembly being adapted for receiving conventional clothes hangers for facilitating hanging clothes after laundering.

6. The system of claim 5, wherein said first hanger assembly further comprises:
   a vertical hanger member slidably coupled to said first vertical support, said vertical hanger member being positionable such that a height of a distal end of said vertical hanger member relative to said frame assembly is adjustable; and
   a horizontal hanger member pivotally coupled to said distal end of said vertical hanger member, said horizontal hanger member being adapted for receiving conventional clothes hangers.

7. The system of claim 1, further comprising a second hanger assembly coupled to a first one of said pair of second vertical supports, said second hanger assembly being adapted for receiving conventional clothes hangers for facilitating hanging clothes after laundering.

8. The system of claim 7, wherein said second hanger assembly further comprises:
   a second vertical hanger member slidably coupled to said first vertical support, said second vertical hanger member being positionable such that a height of a distal end of said second vertical hanger member relative to said frame assembly is adjustable; and
   a second horizontal hanger member pivotally coupled to said distal end of said second vertical hanger member, said second horizontal hanger member being adapted for receiving conventional clothes hangers.

9. The system of claim 1, further comprising a plurality of laundry bags, each one of said laundry bags having a bottom wall and a perimeter wall extending upwardly, said perimeter wall being couplable to said frame assembly such that said laundry bag is held in an open portion while coupled to said frame assembly.

10. The system of claim 9, further comprising a plurality of lid members hingably couplable to said frame assembly, each one of said plurality of lid members being for selectively closing an opening of an associated one of said plurality of laundry bags for inhibiting access to an interior of said laundry bag.

11. A laundry cart system comprising:
   a frame assembly having a first portion and a second portion;
   said first portion having a pair of vertical support members, said first portion having a pair of lateral support members, said lateral support members extending between said pair of vertical support members, said first portion having an upper pair of longitudinal support members extending outwardly from said pair of vertical support members, said first portion having a lower pair of longitudinal support members extending outwardly from said pair of vertical support members, said upper pair of longitudinal support members having a spaced substantially parallel relationship with said lower pair of longitudinal support members;
   said second portion having a pair of second vertical support members, said second portion having a pair of second lateral support members, said second lateral support members extending between said pair of second vertical support members, said second portion having an second upper pair of longitudinal support members extending outwardly from said pair of second vertical support members, said second portion having a second lower pair of longitudinal support members extending outwardly from said pair of second vertical support members, said second upper pair of longitudinal support members having a spaced substantially parallel relationship with said second lower pair of longitudinal support members;

said first portion being couplable to said second portion for forming a support frame having a rectangular cross-section;

wherein a plurality of wheels, each one of said plurality of wheels being coupled to a distal enc of an associated one of said first and second vertical support members, said plurality of wheels facilitating rolling said system along a horizontal support surface such as a floor;

wherein a first aperture extending through a distal end of a first one of said upper longitudinal support members, said first aperture being for facilitating coupling of said first portion to said second portion;

a second aperture extending through a distal end of a second one of said upper longitudinal support members, said second aperture being for facilitating coupling of said first portion to said second portion;

a third aperture extending through a distal end of a first one of said lower longitudinal support members, said third aperture being for facilitating coupling of said first portion to said second portion;

a fourth aperture extending through a distal end of a second one of said lower longitudinal support members, said fourth aperture being for facilitating coupling of said first portion to said second portion;

a first plurality of bores, each one of said first plurality of bores extending through a distal end of a first one of said second upper longitudinal support members, said first plurality of bores being for facilitating coupling of said first portion to said second portion, each one of said first plurality of bores being alignable with said first aperture for adjusting a length of said frame assembly;

a second plurality of bores, each one of said second plurality of bores extending through a distal end of a second one of said second upper longitudinal support members, said second plurality of bores being for facilitating coupling of said first portion to said second portion, each one of said second plurality of bores being alignable with said second aperture for adjusting a length of said frame assembly;

a third plurality of bores, each one of said third plurality of bores extending through a distal end of a first one of said second lower longitudinal support members, said third plurality of bores being for facilitating coupling of said first portion to said second portion, each one of said third plurality of bores being alignable with said third aperture for adjusting a length of said frame assembly; and a fourth plurality of bores, each one of said fourth plurality of bores extending through a distal end of a second one of said second lower longitudinal support members, said fourth plurality of bores being for facilitating coupling of said first portion to said second portion, each one of said fourth plurality of bores being alignable with said fourth aperture for adjusting a length of said frame assembly;

wherein a plurality of pin members, each one of said plurality of pin members being insertable through an associated pairing of a first portion aperture with a second portion bore for securing said first portion to said second portion;

wherein first hanger assembly coupled to a first one of said pair of vertical supports, said hanger assembly being adapted for receiving conventional clothes hangers for facilitating hanging clothes after laundering;

wherein said first hanger assembly further comprises:

a vertical hanger member slidably coupled to said first vertical support, said vertical hanger member being positionable such that a height of a distal end of said vertical hanger member relative to said frame assembly is adjustable; and a horizontal hanger member pivotally coupled to said distal end of said vertical hanger member, said horizontal hanger member being adapted for receiving conventional clothes hangers;

wherein a second hanger assembly coupled to a first one of said pair of second vertical supports, said second hanger assembly being adapted for receiving conventional clothes hangers for facilitating hanging clothes after laundering;

wherein a second vertical hanger member slidably coupled to said first vertical support, said second vertical hanger member being positionable such that a height of a distal end of said second vertical hanger member relative to said frame assembly is adjustable; and a second horizontal hanger member pivotally coupled to said distal end of said second vertical hanger member, said second horizontal hanger member being adapted for receiving conventional clothes hangers;

wherein a plurality of laundry bags, each one of said laundry bags having a bottom wall and a perimeter wall extending upwardly, said perimeter wall being couplable to said frame assembly such that said laundry bag is held in an open portion while coupled to said frame assembly; and wherein a plurality of lid members hingably couplable to said frame assembly, each one of said plurality of lid members being for selectively closing an opening of an associated one of said plurality of laundry bags for inhibiting access to an interior of said laundry bag.

12. The system of claim 11 has an overall height of approximately 3 feet, a length of approximately 20 to 30 feet and a width of approximately 13 inches.

13. The system of claim 11, further comprising a base member couplable to said lower longitudinal support members and said second lower longitudinal support members, said base member providing a bottom for said frame assembly, said base member providing rigidity for said frame member to inhibit twisting of said frame assembly.

* * * * *